United States Patent
Chaban

[11] Patent Number: 5,797,293
[45] Date of Patent: Aug. 25, 1998

[54] PLASTIC DRIVE BLOCK FOR VEHICLE SEAT ADJUSTER

[75] Inventor: Philip A. Chaban, Grass Lake, Mich.

[73] Assignee: Lear Corporation, Southfield, Mich.

[21] Appl. No.: 770,583

[22] Filed: Dec. 19, 1996

[51] Int. Cl.⁶ ............................................. F16H 25/24
[52] U.S. Cl. ......................... 74/89.15; 74/424.8 R; 297/216.18; 297/330; 248/429
[58] Field of Search ................ 74/89.15, 424.8 R; 297/330, 216.18; 248/429

[56] References Cited

U.S. PATENT DOCUMENTS

| | | | |
|---|---|---|---|
| 2,929,439 | 3/1960 | Tanaka et al. | 248/393 |
| 3,043,552 | 7/1962 | Colautti | 248/429 |
| 3,457,234 | 7/1969 | Gianatasio | 260/75 |
| 3,617,021 | 11/1971 | Littmann | 248/393 |
| 4,015,812 | 4/1977 | Heesch | 248/394 |
| 4,274,293 | 6/1981 | Ruger | 74/89.15 |
| 4,432,583 | 2/1984 | Russo et al. | 297/330 |
| 4,794,810 | 1/1989 | Parsons | 74/424.8 |
| 4,802,374 | 2/1989 | Hamelin et al. | 74/89.14 |
| 4,872,903 | 10/1989 | Periou | 74/89.15 |
| 4,939,945 | 7/1990 | Ryder et al. | 74/89.15 X |
| 4,949,585 | 8/1990 | Dauvegne et al. | 74/89.15 |
| 5,014,958 | 5/1991 | Harney | 248/394 |
| 5,048,786 | 9/1991 | Tankaka et al. | 248/429 |
| 5,048,886 | 9/1991 | Ito et al. | 296/65.1 |
| 5,172,601 | 12/1992 | Siegrist et al. | 74/89.15 |
| 5,207,473 | 5/1993 | Nawa et al. | 296/63.1 |
| 5,316,258 | 5/1994 | Gauger et al. | 74/89.14 |
| 5,349,878 | 9/1994 | White et al. | 74/89.15 X |
| 5,445,354 | 8/1995 | Gauger et al. | 248/429 |
| 5,456,439 | 10/1995 | Gauger | 248/429 |
| 5,467,957 | 11/1995 | Gauger | 74/89.15 X |
| 5,473,958 | 12/1995 | Jeck et al. | 74/89.15 |
| 5,507,552 | 4/1996 | Ineich et al. | 297/216.1 |

FOREIGN PATENT DOCUMENTS

| | | |
|---|---|---|
| 3724038 | 2/1989 | Germany. |
| 2260898 | 5/1993 | United Kingdom. |

Primary Examiner—Allan D. Herrmann
Attorney, Agent, or Firm—Young & Basile, P.C.

[57] ABSTRACT

A drive apparatus includes a rotatable threaded shaft disposed between a first member movably mounted with respect to a stationary second member. A housing having a freely movable leg is fixedly mounted to the second member, with the free leg movably extending into an aperture in the second member. A plastic drive block threadingly engaged with the threaded shaft is mounted within the housing. A cushion member is coupled to the drive nut and resiliently supports the drive nut in the housing. Axial forces exerted on the threaded shaft cause deformation of the side leg of the housing into direct contact with the lead screw to form a metal to metal path between the lead screw and the second member through the housing.

20 Claims, 4 Drawing Sheets

PLASTIC DRIVE BLOCK FOR VEHICLE SEAT ADJUSTER

CROSS REFERENCE TO RELATED APPLICATIONS

The present invention is related to inventions disclosed in co-pending U.S. patent application Ser. No. 08/552,878 filed Nov. 3, 1995, entitled "Gimballed Drive Block For Vehicle Seat Adjuster" and co-pending U.S. patent application Ser. No. 08/656,985 filed Jun. 6, 1996 and entitled "Self-Aligning Drive Nut For Vehicle Power Seat Adjuster".

BACKGROUND OF THE INVENTION

1. Field of the Invention

The present invention relates, in general, to vehicle seat adjusters.

2. Description of the Art

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a electric motor which bi-directionally rotates a pair of drive shafts extending outward from the motor to a gear assembly or box mounted on each upper track. In one arrangement, each gear box rotates a lead screw extending longitudinally below and carried by each upper track. A drive block is fixedly mounted to each lower track and threadingly receives the lead screw to cause reciprocal, horizontal movement of the upper track and the attached seat support frame relative to the lower track which is fixed to the vehicle upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front and rear edges of the seat bottom independent of each other as well as simultaneously to raise and lower the entire vehicle seat or, in some applications, only the seat bottom or cushion.

However, the rigid connection between the gears in the gear assembly, the drive motor output shaft, the drive shaft, the lead screw and the drive block frequently leads to problems during assembly and operation of a vehicle power seat adjuster. It is inevitable in the manufacture and assembly of a mechanical mechanism, such as a power seat adjuster, that poor dimensional conditions, such as concentricity, TIR, and linear discrepancies from nominal design dimensions, can and typically do occur. These dimensional conditions, without correction, can cause various problems in the operation of a power seat adjuster, such as poor breakaway from a stop position, slow operation of the power seat adjuster in extreme temperatures, excessive wear of the components of the power seat adjuster, uneven operation of the power seat adjuster, and the generation of unpleasant sounds or squeal. One primary source of objectionable sounds or squeal is due to the rotation of the metal lead screw in the metal drive block.

To address certain of these problems, power seat adjusters have been devised in which the drive block is rotatably mounted in a aperture in the lower track for rotation about an axis extending longitudinally through the drive block and perpendicular to the lower track as shown in U.S. Pat. No. 5,467,957. Such rotation of the drive block is achieved by freely mounting the drive block in the aperture in the lower track without any additional fasteners, or by using a fastener with an enlarged head. In this latter structure, a cylindrical mounting collar or boss extends from the drive block through the aperture in the lower track and receives the fastener in an internal threaded bore. The mounting collar has a length greater than the thickness of the lower track to provide a small amount of vertical play between the drive block and the lower track to permit rotation of the drive block in the aperture in the lower track. Such rotatable drive blocks accommodate variations in end-to-end alignment of the lead screw and the lower track.

It is also known to provide other drive blocks or bearing blocks used in a power seat adjuster to connect the drive shaft to a lead screw and/or to connect the lead screw to a seat block recliner linkage with freedom of movement about two mutually exclusive axes. In this structure, the drive block or bearing block is provided with a pair of outwardly extending legs which ride in slots in a support bracket to enable rotation of the drive or bearing block about an axis extending through the legs. The side walls of the bracket carrying the slots is also formed slightly wider than the drive or bearing block to provide a small amount of lateral translation of the drive or bearing block in the bracket.

While the above-described vehicle seat adjuster drive blocks have proven effective in so far as providing self-alignment characteristics to overcome tolerance build up and misalignment conditions, it would still be desirable to provide a drive block for a vehicle seat adjuster which reduces the noise generated during rotation of the lead screw within the drive block. It would also be desirable to provide a drive block for a vehicle seat adjuster which can conform to all alignment positions of the lead screw relative to a lower track or other component of a vehicle seat adjuster. It would also be desirable to provide such a drive block which does not require major modification of the vehicle power seat adjuster components.

SUMMARY OF THE INVENTION

The present invention is a drive block for coupling rotation of a threaded shaft into movement of one member relative to a stationary second member. The inventive drive block finds particular advantageous use in a vehicle seat adjuster assembly.

Generally, the present invention is a drive apparatus including a first member movable relative to a second member. A threaded shaft is carried by the first member. Means are coupled to the threaded shaft for imparting rotation to the threaded shaft. A drive block has a threaded bore engaged with the threaded shaft.

A housing is fixedly mounted on the second member and has an internal cavity for receiving the drive block threadingly coupled to the threaded shaft. The housing having a free side leg movably extending into an aperture formed in the second member. The side leg has an aperture receiving the threaded shaft therethrough. The housing has an opposite side leg which is deformable under axial forces exerted on the threaded shaft into engagement with the threaded shaft to couple the threaded shaft directly to the second member in metal-to-metal contact.

Means are also provided for resiliently coupling the drive block to the housing. The coupling means preferably includes a resilient cushion member which is coupled between the drive block and the housing. The cushion member includes a recess for receiving the drive block therein. An annular collar extends outward from an opposite surface of the cushion member and seats within the aperture in the side leg of the housing.

Axial forces, such as resulting from vehicle collision, exerted on the lead screw and tending to move the lead screw in either axial direction, cause movement of the drive nut and cushion member against one side leg of the housing and deforms or moves the side leg into direct metal to metal contact with the threaded shaft. Since the opposite side leg is freely mounted in the aperture in the second member, the free end of the side leg moves into engagement with the second member bypassing the plastic drive nut and forming a rigid connection which resists separation of the housing and drive nut from the threaded shaft and first and second members.

The inventive drive apparatus finds particular advantageous use in a vehicle seat adjuster wherein the first and second members respectively comprise a moveable upper track and a fixed lower track of a vehicle seat adjuster. The housing is mounted on the lower track with the side leg freely extending through an aperture formed in the lower track.

The formation of the drive block of the present invention from a resilient or plastic material provides significant advantages in so far as significantly reducing and/or substantially eliminating objectionable noise or squeal previously cause by the threaded rotation of a metal lead screw within a metal drive block, such as a lead screw and drive block employed in a vehicle power seat adjuster. Further, the unique arrangement of the housing supporting the drive block is capable of deformation under axial forces exerted on the lead screw, such as during a vehicle collision, and moves into engagement with the lead screw to form a direct metal to metal path between the lead screw and the lower track which bypasses the plastic drive nut. This creates a rigid structure which resists separation of the drive nut and lead screw from the upper and lower tracks, despite the use of a plastic drive nut. Finally, the enlarged diameter apertures formed in opposed side legs of the housing allow the threaded shaft to freely and non-threadingly extend through the housing. This enables the drive block and cushion member mounted within the housing to freely move in vertical, horizontal and/or lateral directions, to accommodate any misalignment between the housing, lower track and threaded shaft or lead screw.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
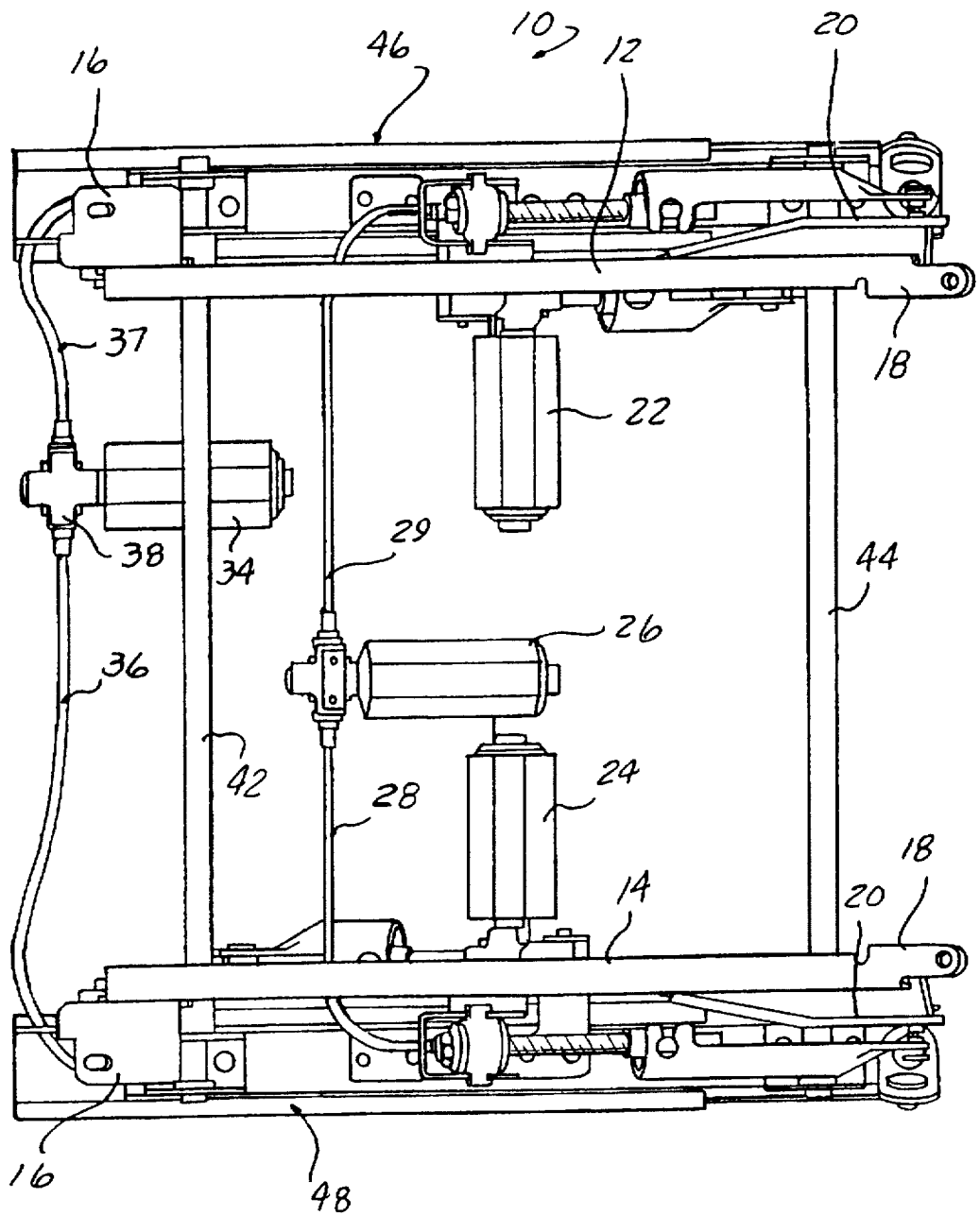
FIG. 1 is a plan view of a vehicle power seat adjuster incorporating the drive block of the present invention.
Figure 2:
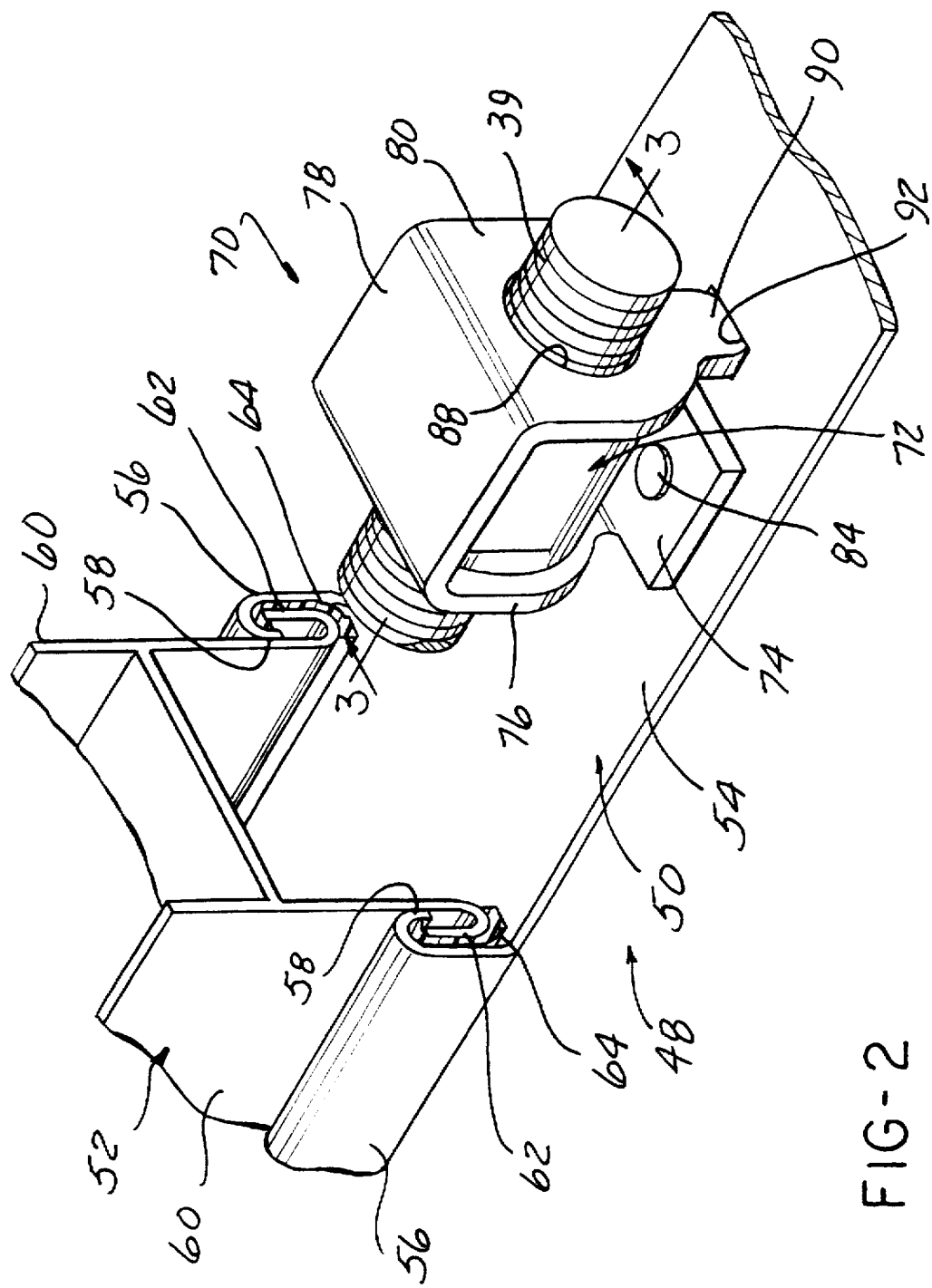
FIG. 2 is a partial, perspective view of one track assembly of the vehicle seat adjuster shown in FIG. 1 and depicting a drive block constructed in accordance with the teachings of the present invention.

Referring now to the drawing, and to FIGS. 1 and 2 in particular, there is illustrated a conventional, prior art power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster, as well as pivotal tilting of the seat back with respect to the seat bottom. It will be understood, however, that the present invention described hereafter is employable with a power seat adjuster which includes at least one of such movements or adjustments, such as a horizontal fore/aft movement by itself or in combination with any number of the other such movements described above, each of which can also be used separately. Further, the present invention is also usable in a drive for a manual seat adjuster.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10. A seat back pivot bracket 20 is mounted on each of the seat support frame members 12 and 14 to provide a pivot connection to the seat back, not shown, and to permit selective tilting or pivotal movement of the seat back with respect to the seat bottom as is typical in so-called "seat recliners".

Various drive assemblies are mounted on the power seat adjuster 10 to provide selective movement of various components of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws. Each lead screw is connected by a drive link to one of the seat back pivot brackets 20 mounted on opposite sides of the power seat adjuster 10 to provide selective pivotal adjustment of the seat back with respect to the seat bottom of a vehicle seat mounted on the seat support frame members 12 and 14.

The power seat adjuster 10 also includes a horizontal drive means formed of an electric motor 34 which is fixedly mounted to one of the upper tracks of the power seat adjuster 10 by means of a suitable bracket, not shown. A pair of bi-directional rotatable drive shafts 36 and 37 extend outward from a gear assembly or box 38 integrally connected to the output shaft of the drive motor 34 to a rotatable connection with a lead screw 39 disposed in each of a pair of opposed track assemblies as described hereafter.

The power seat adjuster 10 also optionally includes front and rear tubular torsion tubes or rods 42 and 44, respectively, which extend between and are connected to opposed track assemblies denoted generally by reference numbers 46 and 48 to provide a rigid support structure for the power seat adjuster 10.

As each of the track assemblies 46 and 48 is identically constructed, the following description will be provided for only track assembly 48. It will be understood that the opposite track assembly 46 is constructed in the same manner. As shown in FIGS. 1 and 2 the track assembly 48 includes a lower track 50 and an upper track 52. The upper track 52 is slidably disposed within the lower track 50 and is reciprocatingly, bi-directionally movable along the lower track 50 under the control of the horizontal drive means.

FIG. 2 depicts a portion of the vehicle track assembly 48. The lower track 50 is fixed by suitable mounting brackets, not shown, in a stationary position on the vehicle floor. The lower track 50 includes a generally planar base 54 having a pair of upstanding side walls 56 on opposite sides thereof. The side walls 56 smoothly curve into and terminate in downwardly extending inner flanges 58. As shown in FIG. 2, the inner flanges 58 are spaced from the side walls 56 to define a slot therebetween which extends longitudinally along the lower track 50.

The upper track 52 may take any one of a number of different configurations. By way of example only, the upper track 52 is formed of a pair of vertically extending side walls 60, the lower ends of which curve outwardly and upwardly to form end flanges 62. The end flanges 62 are disposed in the slot formed between the inner flange 58 and the side walls 56 of the lower track 50.

A low friction slide member 64 is disposed between the facing surfaces of the flanges 62 of the upper track 52 and the side walls 56 and the inner flanges 58 of the lower track 50 to facilitate easy sliding movement of the upper track 52 relative to the stationarily fixed lower track 50.

Further, as shown in FIG. 1, each torsion tube 42 and 44 is rotatably mounted in suitable mounting brackets which are fixed to opposite ends of each upper track 52. A fastener, not shown, such as a conventional push nut, is mounted on the outer end of each torsion tube 42 and 44 to securely retain each torsion tube 42 and 44 in the associated mounting bracket.

As described above, the electric horizontal drive motor 34 is mounted by a suitable bracket or other mounting members to the upper tracks 52 of the power seat adjuster 10 and typically located between the track assemblies 46 and 48 as shown in FIG. 1. The motor 34 has a rotatable output shaft, which rotates in either of two directions depending upon the selective mode of energization of the motor 34. The gear means 38 in the form of a gear box or gear assembly is integrally formed as part of the motor 34 and is connected to the output shaft of the motor 34. The gear means 38 functions to convert rotation of the output shaft of the motor 34 to rotation of the two horizontal drive shafts 36 and 37. The gear means 38 may also be mounted separate from the motor 34 while still being coupled to the output shaft 35 of the motor 34. A suitable gear reduction may be implemented by the gear means 38 so as to provide a low speed of rotation with high torque to the drive shafts 36 and 37.

Instead of a motor having a rotatable output shaft, the horizontal, vertical and/or recliner drive mechanisms may use a motor driven linear actuator which translates an output shaft in either direction.

Figure 3:
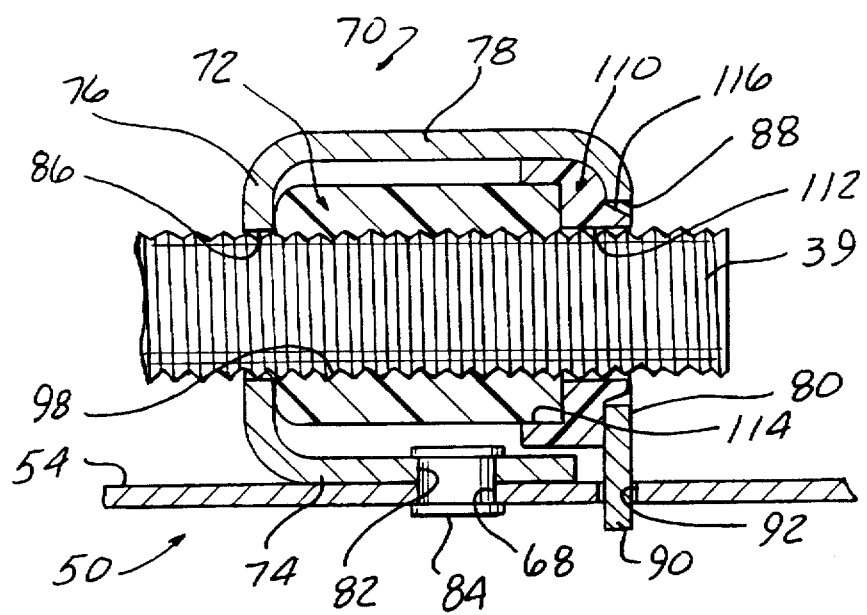
FIG. 3 is a cross sectional view generally taken along line 3—3 in FIG. 2.
Figure 4:
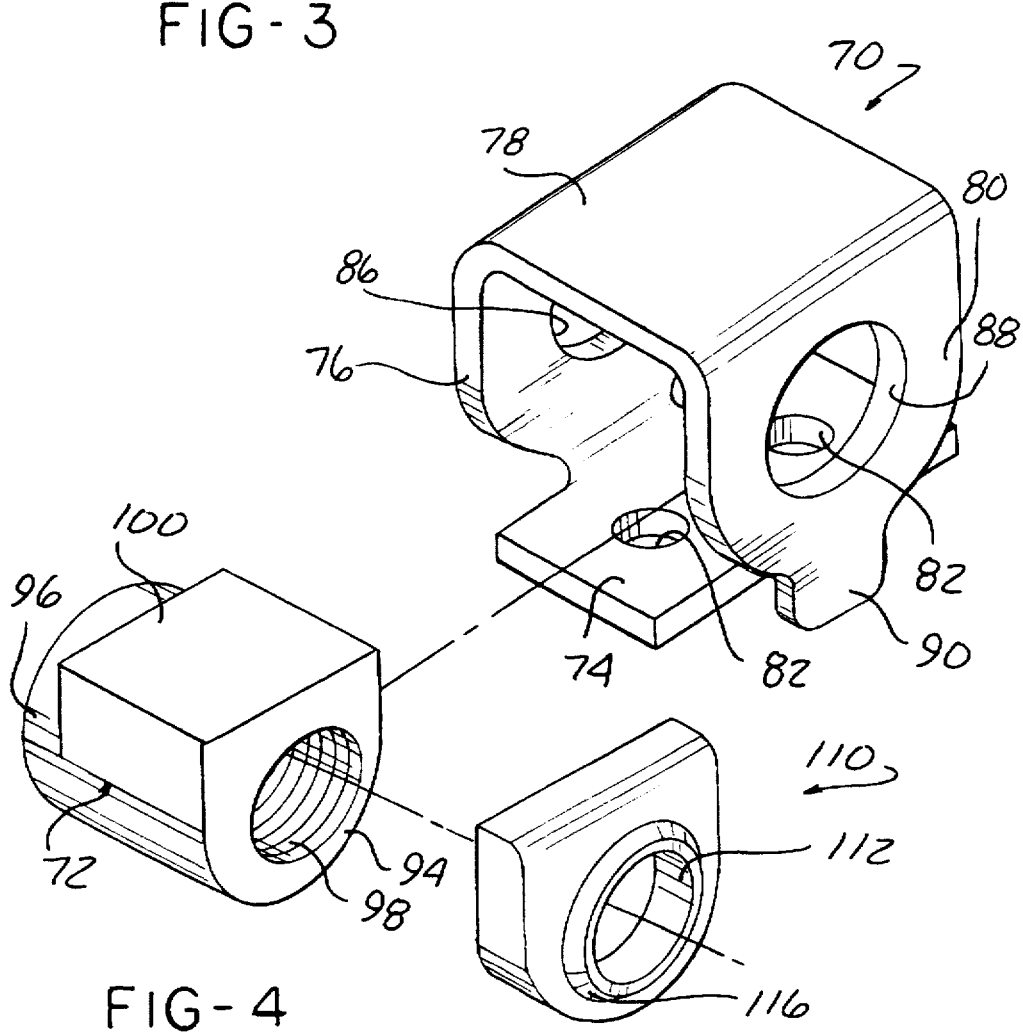
FIG. 4 is an exploded, perspective view of the drive block, cushion member and drive block housing.

Referring now to FIGS. 2–4, there is depicted a unique drive block apparatus constructed in accordance with the teachings of the present invention. The inventive drive block couples the rotatable shaft or lead screw 39 to one stationary component, such as the lower track 50 of the vehicle seat adjuster, to effect movement of another component, such as the upper track 52 of the vehicle seat adjuster, relative to the stationary component or lower track 50 upon rotation of the shaft or lead screw 39.

As shown in FIGS. 2–4, a drive block mounting housing or cage 70 is provided for supporting a drive block 72. The housing 70 is preferably formed of a high strength metal, such as a SAE J1392-XF steel. The housing 70 is bent or formed from an original strip-like shape to a generally square configuration as shown in FIGS. 2–4. In this configuration, the housing 70 includes a lower leg 74, a first side leg 76, a top leg 78 and a second side leg 80 which is generally parallel to and spaced from the first side leg 76 and the end of the lower leg 74. As shown in FIGS. 3 and 4, at least one and preferably a pair of laterally spaced apertures 82 are formed in the lower leg 74 and are aligned with the apertures 68 in the base 54 of the lower track 50 as shown in FIG. 3. Suitable fasteners, such as rivets 84, are mounted through the aligned apertures 68 and 82 to fixedly mount the housing 70 to the base 54 of the lower track 50.

The first side leg 76 has an aperture 86 formed therein which has a diameter sufficient to allow the lead screw 39 to freely extend therethrough without contacting the first side leg 76.

The opposed second side leg 80 has an aperture 88 formed therein. The aperture 88 has a diameter larger than the diameter of the aperture 86 in the first side leg 76 to allow the lead screw 39 to freely extend therethrough.

The second side leg 80 also has a smaller width neck or end 90. The neck 90 on the second side leg 80 freely movably extends into a laterally extending aperture or slot 92 formed in the base 54 of the lower track 50 as shown in FIGS. 2 and 3. The slot 92 is spaced from the aperture 68 formed in the lower track 50. As seen in FIGS. 2–4, the neck 90 and the second leg 80 are freely movably relative to the stationary lower leg of the housing 70 which is fixed to the lower track 50.

The drive block 72 is formed of a suitable high strength plastic, such as glass reinforced Nylon 6. As shown in FIGS. 2–4, the drive block 72 has a generally tubular shape with opposed first and second ends 94 and 96, respectively. A threaded bore 98 extends longitudinally through the drive block 72 and threadingly engages the threaded drive shaft or lead screw 39. As shown in FIG. 4 by reference number 100, an end portion extending from the first end 94 of the drive nut 72 is flattened.

Means 110 are provided for resiliently mounting or coupling the drive nut 72 to the housing 70. The means 110 preferably is in the form of a cushion nut formed of a resilient plastic, such as a durometer 50 polyureathane.

The cushion nut 110 has a through bore 112 which is alignable with the threaded bore 98 in the drive block 72. An enlarged diameter recess 114, shown in FIG. 3, extends inward from one end of the cushion nut 110 and telescopingly receives the first end 94 of the drive nut 72, as also shown in FIG. 3. The opposite end surface of the cushion nut 100 has an annular collar 116 extending therefrom which seats within the outer periphery of the aperture 88 in the second side leg 80 of the housing 70. A bore formed in this opposite end surface has a diameter larger than the diameter of the lead screw 39.

In assembling the drive block apparatus of the present invention, the housing 70 is initially formed to the shape shown in FIGS. 2–4. The housing 70 is then fixedly mounted on the lower track 50 by means of rivets 84. The cushion nut 110 is then mounted on the first end 94 of the drive block 70, before the joined cushion nut 110 and drive nut 72 are inserted into the housing 70 between the apertures 86 and 88 in the first and second side legs 76 and 80, respectively of the housing 70. The lead screw 39 is then passed through one of the apertures 86 or 88 and threaded into engagement with the threaded bore 98 in the drive nut 72. The lead screw 39 then extends through the other aperture 86 or 88 in the housing 70 as well as through the cushion nut 110 without threadingly engaging the housing 70 or the cushion nut 110.

In operation, the cushion nut 110 supports the drive block 72 in the housing 70. Due to the large diameter aperture 88 formed in the second side leg 80 and the large diameter aperture 86 in the first side leg 76 of the housing 70, the joined cushion nut 110 and drive nut 72 are capable of vertical, horizontal and lateral movement within the housing 70 to accommodate any alignment position of the lead screw 39 relative to the housing 70. As the cushion nut 110 is disposed in contact with the inner surface of the housing 70 at the second side leg 80, the drive block 72 is substantially stationarily supported for threading engagement with the lead screw 39. Since the drive block 72 is formed of plastic, rotation of the lead screw 39 within the drive block 72 does not create any significant noise or squeal as is common in previously devised drive nuts for power seat adjusters utilizing a metal lead screw and a metal drive nut.

Figure 5A:
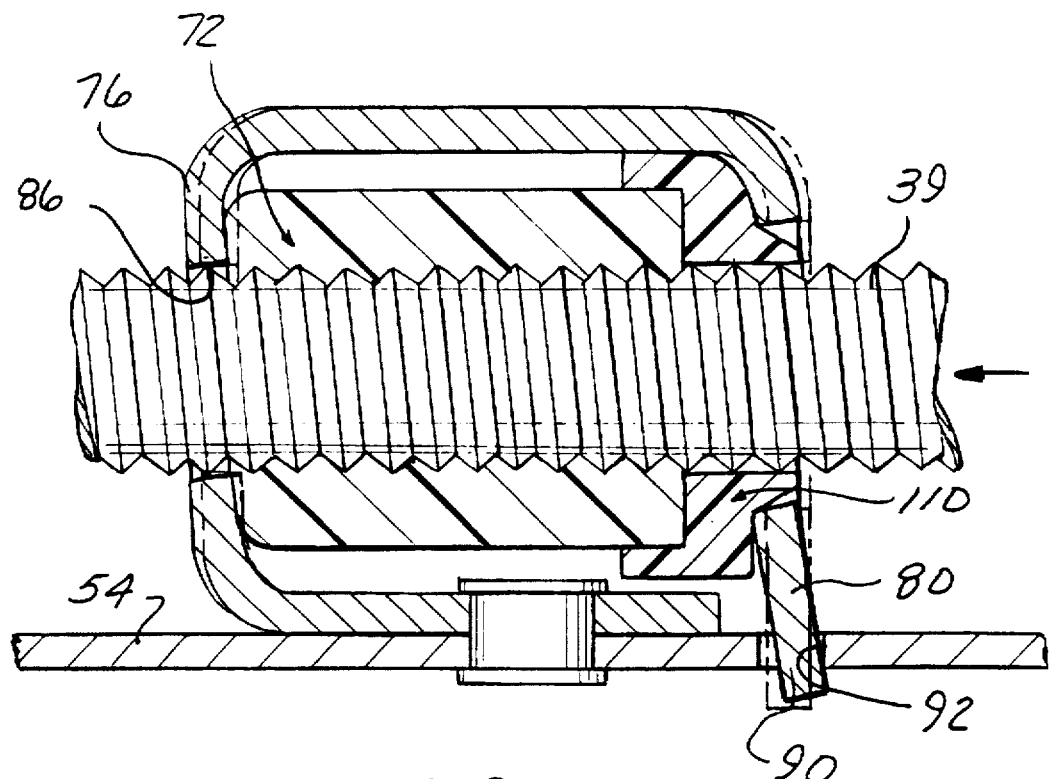
FIGS. 5A and 5B are cross sectional views, generally similar to FIG. 3, but showing the deformed position of the drive block housing under collision loads.
Figure 5B:
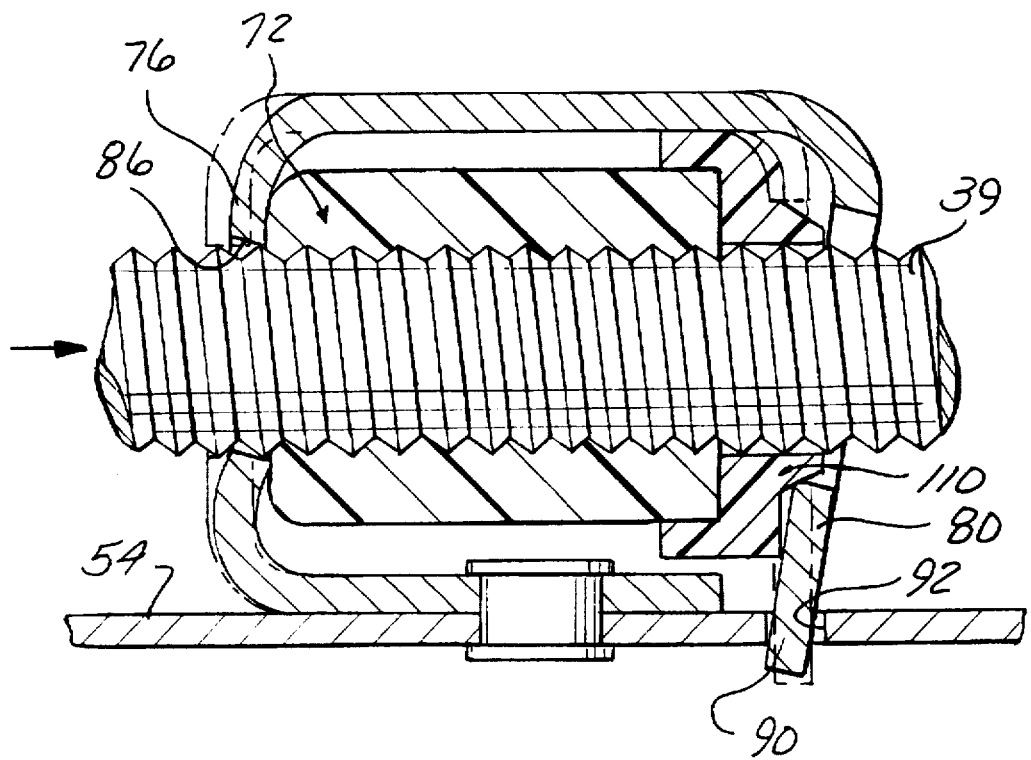

During a collision, axial forces in either a forward direction (FIG. 5A) or rearward direction (FIG. 5B) will be exerted on the lead screw 39 tending to shift the lead screw 39 in a forward or rearward vehicle direction. Such forces are transmitted through the drive block 72 and/or cushion block 110 to the housing 70 resulting in a deformation of the first and second side legs 76 and 80 of the housing 70. Such deformation is possible due to the freely moveable position of the neck 90 of the housing 70 in the slot 92 in the lower track 50.

Deformation or bending of the first leg 76 moves the first leg 76 into contact with the metal lead screw 39. At the same time, the neck 90 moves in the slot 92 and engages the lower track 50. This forms a metal to metal connection between the lead screw 39 and the lower track 50 which bypasses the plastic drive nut 72.

In summary, there has been disclosed a unique drive block for a vehicle power seat adjuster which minimizes and substantially reduces any objectionable noise or squeal typically caused by rotation of a metal lead screw within a metal drive nut as in previous vehicle power seat adjusters. The plastic drive nut and associated metal housing are uniquely formed so as to create metal to metal contact between the lead screw, the housing and the lower track, bypassing the plastic drive nut during a vehicle collision which exerts axial forces on the lead screw.

What is claimed is:

1. A drive apparatus comprising:

first and second members, the first member movable relative to the second member;

a threaded shaft carried with the first member;

means, coupled to the threaded shaft, for imparting rotation to the threaded shaft;

a drive block having a threaded bore engagable with the threaded shaft;

a metal housing fixedly mounted on the second member and having an internal cavity for receiving the drive block threadingly coupled to the threaded shaft; and means, carried on the housing and normally spaced from the threaded shaft and having a portion freely movable relative to and normally non-contacting the second member and movably responsive to axial movement of the drive block, due to forces exerted on the threaded shaft for forming a contact path between the threaded shaft and the second member through the housing upon axial movement of the drive block.

2. A drive apparatus comprising:

first and second members, the first member movable relative to the second member;

a threaded shaft carried with the first member;

means, coupled to the threaded shaft, for imparting rotation to the threaded shaft;

a drive block having a threaded bore engageable with the threaded shaft;

a housing fixedly mounted on the second member and having an internal cavity for receiving the drive block threadingly coupled to the threaded shaft, the housing having one side leg movably extending into an aperture formed in the second member, the side leg deformable under forces exerted on the threaded shaft into engagement with the threaded shaft to couple the threaded shaft directly to the second member through the housing.

3. The drive apparatus of claim 2 further comprising:

means for resiliently supporting the drive block in the housing.

4. The drive apparatus of claim 3 wherein the resiliently supporting means comprises:

a resilient cushion member coupled between the drive block and the housing.

5. The drive apparatus of claim 4 wherein:

the cushion member has a first end with a recess for receiving the drive block therein.

6. The drive apparatus of claim 2 wherein:

the one side leg of the housing has an enlarged diameter aperture freely passing the threaded shaft therethrough.

7. The drive apparatus of claim 6 wherein:

the housing has a coaxial aperture formed in an opposed side leg aligned with the aperture in the one side leg for freely receiving the threaded shaft therethrough.

8. The drive apparatus of claim 2 wherein:

the drive block is formed of a resilient material.

9. The drive apparatus of claim 8 further comprising:

a resilient cushion coupled between the drive block and the housing.

10. The drive apparatus of claim 9 wherein:

the cushion member has a first end with a recess for receiving the drive block therein.

11. The drive apparatus of claim 8 wherein:

the one side leg of the housing has an enlarged diameter aperture freely passing the threaded shaft therethrough.

12. The drive apparatus of claim 11 wherein:

the housing has a coaxial aperture formed in an second side leg aligned with the aperture in the first side leg for freely receiving the threaded shaft therethrough.

13. The drive apparatus of claim 2 wherein the first and second members comprise:

lower and upper tracks, respectively, of a vehicle seat adjuster track assembly;

the threaded shaft interposed between the lower and upper tracks; and the housing fixedly mounted on the lower track.

14. A power seat adjuster comprising:

a stationary lower track;

an upper track movably mounted with respect to the lower track;

a threaded lead screw rotatingly extending between the lower track and the upper track;

drive means, coupled to the lead screw, for rotating the lead screw;

a drive block having a threaded bore engageable with the threaded shaft;

a housing fixedly mounted on the lower track and having an internal cavity for receiving the drive block threadingly coupled to the threaded shaft, the housing having one side leg, the one side leg deformable under forces exerted on the threaded shaft into engagement with the threaded shaft to couple the threaded shaft directly to the lower track through the housing.

15. The power seat adjuster of claim 14 further comprising:

means for resiliently supporting the drive block in the housing.

16. The power seat adjuster of claim 15 wherein the resiliently supporting means comprises:

a resilient cushion member coupled between the drive block and the housing.

17. The power seat adjuster of claim 16 wherein the cushion member comprises:

a first end having a recess for receiving the drive block therein.

18. The power seat adjuster of claim 14 wherein:

the one side leg of the housing has an enlarged diameter aperture freely passing the threaded shaft therethrough.

19. The power seat adjuster of claim 18 wherein:

the housing has a coaxial aperture formed in an opposed side leg aligned with the aperture in the one side leg for freely receiving the threaded shaft therethrough.

20. The power seat adjuster of claim 14 wherein:

the drive block is formed of a resilient material.

* * * * *